United States Patent

Wieland, Jr. et al.

[11] 3,970,815
[45] July 20, 1976

[54] STUD WELDING TOOL

[75] Inventors: Howard N. Wieland, Jr., Amherst; Lawrence A. Krischer, Elyria, both of Ohio

[73] Assignee: TRW Inc., Cleveland, Ohio

[22] Filed: Nov. 6, 1974

[21] Appl. No.: 521,183

[52] U.S. Cl. .............................................. 219/98
[51] Int. Cl.² ......................................... B23K 11/04
[58] Field of Search ....................... 219/98; 279/102

[56] References Cited
UNITED STATES PATENTS

| | | | |
|---|---|---|---|
| 2,568,222 | 9/1951 | Crecca et al. | 219/98 |
| 3,052,793 | 9/1962 | Dash | 219/98 |
| 3,758,744 | 9/1973 | Spisak | 219/98 |
| 3,809,849 | 5/1974 | Spisak | 219/98 |
| 3,826,893 | 7/1974 | Glorioso | 219/98 |

Primary Examiner—Arthur T. Grimley
Assistant Examiner—David A. Tone
Attorney, Agent, or Firm—Allen D. Gutchess, Jr.

[57] ABSTRACT

An improved welding tool for end welding studs to workpieces is set forth. The tool includes simplified and inexpensive means for removably connecting a chuck to a chuck leg of the tool. The tool further includes a welding foot for holding a floating spark shield which can move toward and away from the tool body to assure that the shield will be in contact with the workpiece during welding. The tool has threaded spacing means for accurately positioning the welding foot at selected distances from the tool body to control the plunge stroke of the stud during a welding cycle. The rear of a chuck leg of the tool has a coil plunge spring thereon and a seating shoulder engaging an end of the spring to plunge the chuck leg and the chuck toward the workpiece when the spring is under compression. An adjustable seating sleeve is located around the rear portion of the chuck leg, but separate therefrom, and engages the other end of the spring. Means are provided for moving the seating sleeve toward and away from the seating shoulder of the chuck leg to change the degree of compression of the spring.

21 Claims, 8 Drawing Figures

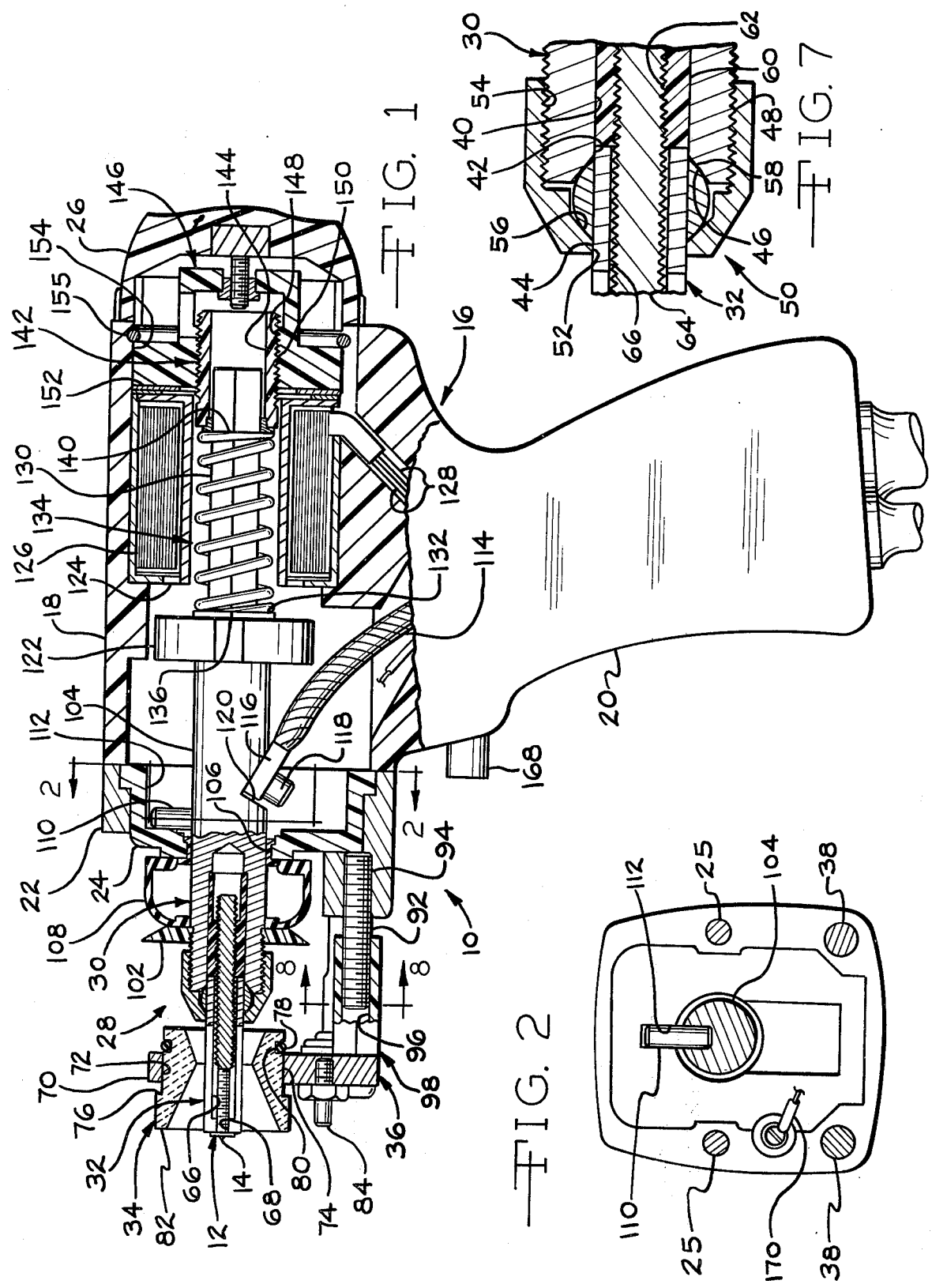

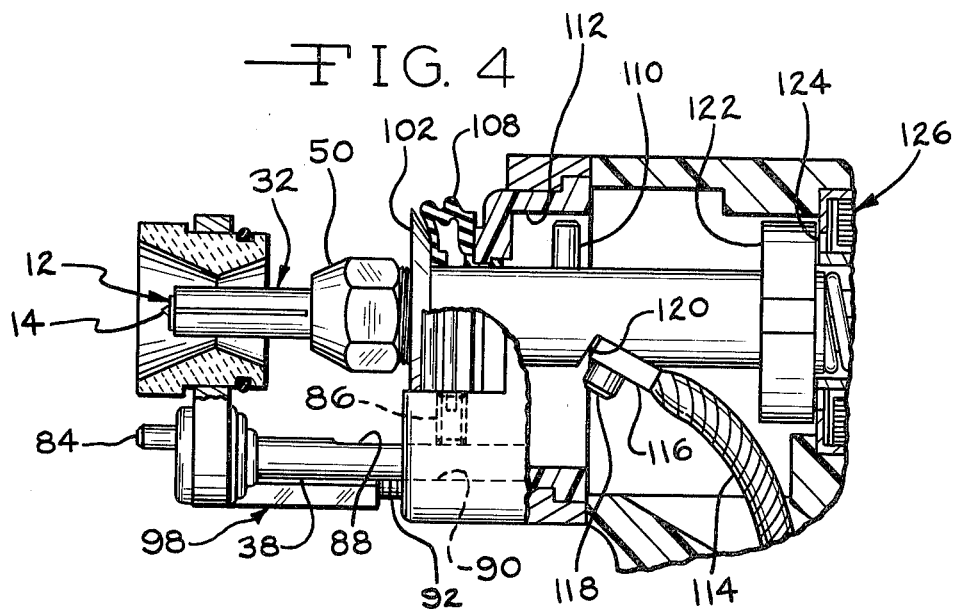
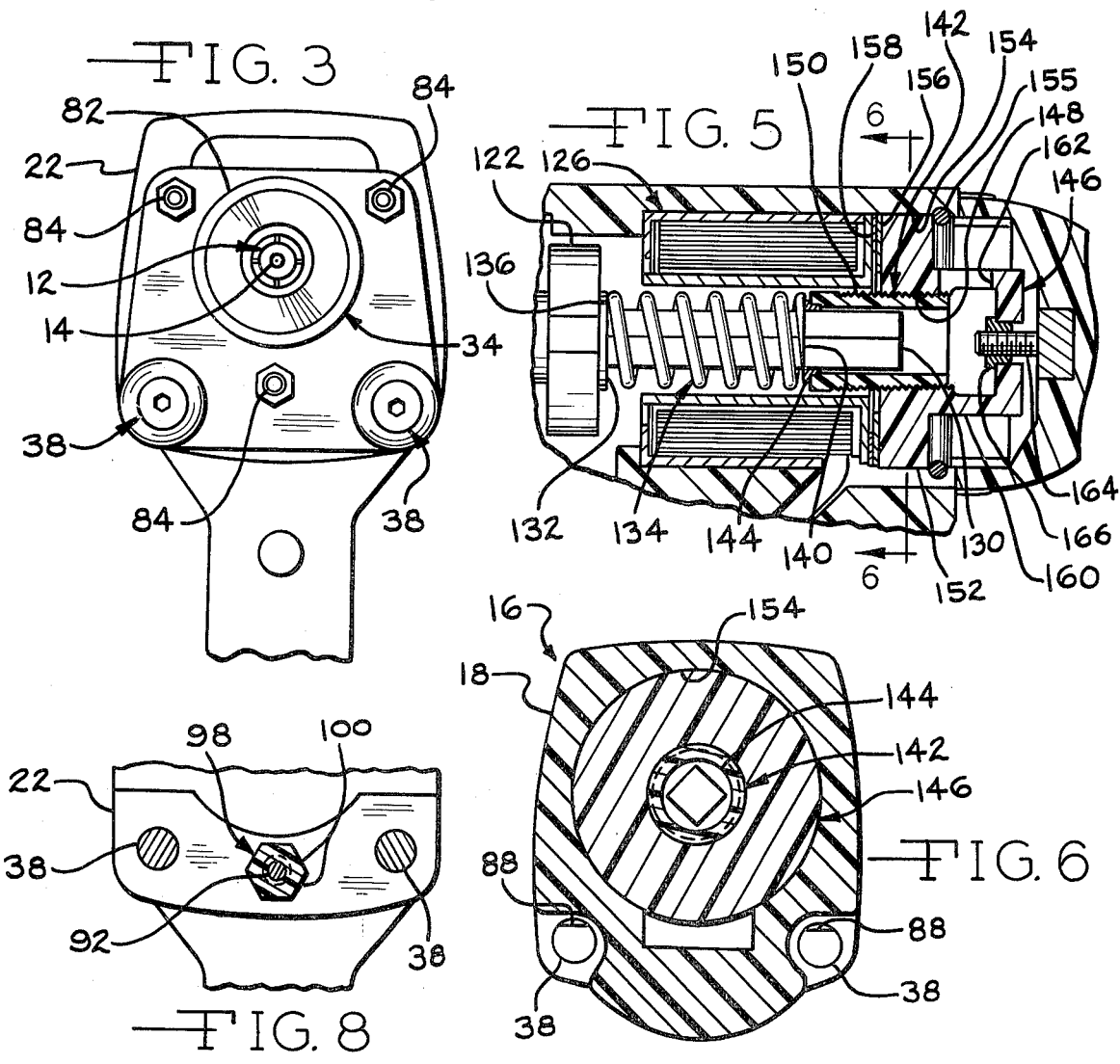

STUD WELDING TOOL

This invention relates to an improved tool for welding studs to workpieces.

A welding tool in accordance with the invention is particularly designed to end weld a small stud having a precisely formed tip to a workpiece in a downhand position, with the workpiece horizontal. The stud is held by a chuck assembly having a chuck leg and a chuck which holds the stud with the tip extending forwardly. An electrical coil magnetically holds the chuck leg in a fixed, retracted position after the operator manually retracts the chuck assembly. When the coil is deenergized, a plunge spring which is under compression plunges the chuck leg, chuck and stud back toward the workpiece. A high voltage is imposed between the stud and the workpiece prior to the stud contacting the workpiece by a capacitive power source. When the stud tip reaches the workpiece, the tip is vaporized and adjacent portions of the stud and workpiece melt with the stud becoming securely welded thereto.

The present invention provides an improved welding tool and specifically one which end welds small tipped studs in the manner described above. The welding tool includes an inexpensive and simplified means for removably connecting a chuck to a chuck leg which enables the chuck to be quickly replaced when necessary. The connection includes a ring located around a rear portion of the chuck which engages a beveled surface of an end of the chuck leg and in turn is engaged by a beveled surface of a nut which is threadedly connected to the chuck leg. As the nut is tightened, it forces the ring inwardly into engagement with the chuck.

The new welding tool also has a welding foot having positioning posts which abut the workpiece to position a spark shield around the end of the chuck and a stud held thereby. The spark shield can float or move to a limited extent toward and away from the tool body to assure that the end of the spark shield will be in the plane of the stud tip and against the workpiece when the weld is effected.

The welding foot is adjustably connected by a pair of supporting legs to the tool body and can be moved in and out to change the spacing of the welding foot and positioning posts from the tool body and change the length of the plunge stroke of the stud. A threaded rod and sleeve are connected between the welding foot and the tool body to select the position of the foot, the sleeve being calibrated to accurately position the foot.

The new tool also has means for adjusting the compression of the coil plunge spring which plunges the chuck leg, chuck, and stud back toward the workpiece. To accomplish this, the coil plunge spring is located around a rear portion of the chuck leg and has one end engaging a seating shoulder on the leg. A seating sleeve is located around the rear portion of the chuck leg but separate therefrom, with the sleeve engaging the opposite end of the coil spring. The sleeve can be moved toward and away from the seating shoulder of the chuck leg to adjust the compression on the spring. The movement of the sleeve is accomplished by a threaded member which is rotatably supported by the tool body but prevented from moving longitudinally. The threaded member has an internal thread which engages external threads on the sleeve to move the sleeve longitudinally when the member is turned. The member also has visual means for enabling an operator to determine the position of the sleeve and thus provide an indication of the degree of compression on the coil plunge spring.

It is, therefore, a principal object of the invention to provide an improved welding tool having the features discussed above.

Many other objects and advantages of the invention will be apparent from the following detailed description of a preferred embodiment thereof, reference being made to the accompanying drawings, in which:

FIG. 1 is a side view in elevation, with parts broken away and with parts in section, of a welding tool according to the invention;

FIG. 2 is a view in transverse cross section taken along the line 2—2 of FIG. 1;

FIG. 3 is a fragmentary front view in elevation of the welding tool of FIG. 1;

FIG. 4 is a fragmentary view in longitudinal cross section of a portion of the tool of FIG. 1, but showing components in a different position;

FIG. 5 is a fragmentary view in longitudinal cross section of a portion of the tool of FIG. 1, but showing components in a different position;

FIG. 6 is a view in transverse cross section taken along the line 6—6 of FIG. 5;

FIG. 7 is an enlarged, detailed view in longitudinal section of a small portion of the apparatus of FIG. 1; and FIG. 8 is a view in transverse cross section taken along the line 8—8 of FIG. 1.

Referring to the drawings, a stud welding tool 10 embodying the invention is used to weld a tipped stud 12 having a specially and precisely formed tip 14 to a workpiece. The tool includes means for holding the stud in a position retracted from the workpiece, and means for plunging the stud toward and against the workpiece. Before the stud is plunged against the workpiece, a high voltage is imposed between the stud and the workpiece. When the stud approaches the workpiece, the tip 14 is vaporized and an arc is established between the stud and the workpiece which melts adjacent portions of the stud and the workpiece to weld the stud firmly thereto.

The tool 10 has an overall main body or housing 16 including a central portion 18 of suitable dielectric material and an integral pistol grip 20. The body 16 further includes a front metal frame 22 and a front wall 24 of dielectric material. The frame 22 holds the wall 24 in position and is affixed to the central body portion 18 by side fasteners 25 (FIG. 2). A separate rear end cap 26 closes off the rear of the central body portion 18.

A chuck assembly 28, comprising a chuck leg 30 and a chuck 32, holds the stud 12 in front of the tool 10 during a welding operation. In this instance, the front end of the chuck 32 is surrounded by a permanent spark shield 34 carried by a welding foot 36. The welding foot is adjustably supported by two supporting legs 38 which are adjustably held in the body 16 and specifically in the metal frame 22. The permanent spark shield 34 lasts for a multiplicity of welds before it needs replacement, although a ceramic ferrule can be employed for some applications, if desired.

Referring particularly to FIG. 7, the connection between the chuck 32 and the chuck leg 30 will be discussed. The chuck leg 30 has a recess 40 including a forward end portion 42 which receives a rear cylindrical end portion 44 of the chuck 32. The portion 42 of the leg 30 has a bevel 46 extending inwardly and away from the recess and the outer surface of the chuck leg 30 has a threaded portion 48 at the forward end. A nut 50 has a central opening 52 and a larger opening at the other end having internal threads 54 which are threadedly engaged with the threaded portion 48 of the leg 30. The nut 50 also has a bevel 56 adjacent the central opening 52 with the bevel facing inwardly and toward the chuck leg 30. A connecting ring 58 has an inner diameter just slightly larger than the end portion 44 of the chuck 32 and fits over the end when it extends through the opening 52 of the nut 50 and into the shoulder portion 42 of the recess 40. When the nut 50 is tightened on the leg 30, with the ring 58 in place, the beveled surfaces 46 and 56 engage the edge portions of the arcuate outer contour of the ring 58 and force it into engagement with the outer surface of the end portion 44 of the chuck 32. This firmly holds the chuck in place relative to the chuck leg. With this arrangement, the chuck 32 can be quickly connected or disconnected from the chuck leg 30. Further, the chuck 32 can be initially longitudinally positioned as desired within limits relative to the chuck leg 30 and yet is securely held at all times.

A plastic sleeve 60 is located within the chuck leg recess 40 and backs up the chuck 32, the sleeve having an internal threaded passage 62. A threaded rod 64 is threadedly engaged in the sleeve 60 and extends into a central passage 66 in the chuck 32 to back up the end of the stud 12 when held by jaws 68 (FIG. 1) of the chuck 32.

The welding foot 36 includes a body 70 of conducting material, e.g., aluminum, of predetermined thickness having an opening 72 therein which receives the spark shield 34 and specifically a cylindrical portion 74 thereof. The spark shield has a shoulder or flange portion 76 of a size larger than that of the opening 72 to limit the extent to which the spark shield can move toward the body 16. The spark shield also has removable means in the form of a resilient ring 78 located in a groove 80 of the spark shield. The ring extends beyond the periphery of the cylindrical portion 74 and limits movement of the spark shield 34 away from the body 16. However, the spark shield 34 can float toward and away from the body 16 relative to the foot 36 to assure that an outer annular end 82 of the shield will be against the workpiece during a welding cycle. The floating spark shield also eliminates the need for tight tolerances on the shield and on three positioning posts or feet 84, which tolerances are otherwise required to make certain both the shield and posts are in exactly the same plane.

The positions of the stud 12 and the spark shield 34 are determined by the positioning posts 84 which are threadedly engaged in the foot 36 and extend forwardly therefrom equal distances. The stud 12, in its outermost position, preferably extends slightly through the plane of the positioning posts 84 to assure that the stud 12 will plunge back against the workpiece during the welding operation. In the forwardmost position of the spark shield 34, the forward annular edge 82 likewise extends slightly beyond the plane of the posts 84 to assure that the spark shield will be in contact with the workpiece when the positioning posts 84 are in engagement therewith.

The distance between the welding foot 36 and the tool body 16 is maintained by setscrews 86 (FIG. 4) which engage flats 88 on the legs 38 when within passages 90 of the frame 22. The foot 36 can be adjusted simply by loosening the setscrews and sliding the legs 38 in and out relative to the passages 90. In order to accurately position the foot 36, a threaded rod 92 is threadably engaged in a threaded passage 94 in the frame 22 and extends forwardly thereof. A forward end of the threaded rod 92 is received in a threaded passage 96 of a threaded sleeve 98 having a forward end abutting the rear surface of the body 70 of the foot 36. To adjust the position of the foot 36, the set-screws 86 are loosened and the legs moved in or out to position the rear surface of the foot 36 against the forward end of the sleeve 98. As shown in FIG. 8, the sleeve has a hexagonal outer surface forming flats 100. When the sleeve is turned to the next flat, the foot accordingly is positioned in or out an accurate, predetermined amount dependent upon the pitch of the threaded rod 92, e.g., 0.005 inch. Suitable indicia can be placed on the sleeve for this purpose.

Referring in more detail to the chuck leg 30, an operator's flange or disc 102 (FIGS. 1 and 4) is located on the threaded portion 48 of the leg 30 and can be engaged by the operator's fingers to retract the chuck assembly 28. A cylindrical portion 104 to the rear of the threaded portion 48 is slidably supported in a nylon bearing 106 which is mounted in the front wall 24. Between the bearing 106 and the flange 102 is a rubber bellows 108 for dirt protection. To the rear of the bearing 106, the cylindrical portion 104 of the leg 30 has an outwardly extending pin 110 (FIG. 2 also) which is received in a groove 112 of the wall 24 to prevent rotation of the leg and limit the maximum forward position of it. Below the pin 110, on the opposite side of the cylindrical portion 104, a welding cable 114 has a terminal ear 116 connected to the chuck leg 30 by a threaded fastener 118 affixing the ear 116 in a notch 120 of the leg. To the rear of the cylindrical portion 104 is a magnetic flange 122 extending outwardly well beyond the cylindrical portion 104. When the chuck assembly 28 is in a retracted position, as shown in FIG. 4, the flange 122 is held against an annular face 124 of an electrical coil 126 having suitable conductors 128 (FIG. 1) extending down into the handle.

To the rear of the flange 122, the chuck leg 30 has a rearwardly extending portion 130 (FIGS. 1 and 5) with a seating member of shoulder 132 located between the flange 122 and the rear portion 130. A coil plunge spring 134 has a forward end 136 engaging the seating member 132. A rear end 140 of the spring 134 engages a second seating member or sleeve 142. The sleeve 142 has a noncircular opening formed, in this instance, by a bushing 144 which is of a shape similar to the shape of the rear portion 130 of the chuck leg 30. Both the portion 130 and the bushing 144 are square, as shown in FIG. 6 to prevent the sleeve from turning relative to the rear portion. An outer threaded member 146 has internal threads 148 engagable with the outer threads 150 on the sleeve 142. The member also has a thick outer flange 152 which is rotatably held in an inner cavity 154 of the body portion 18 between a snap ring 155 on one side and a flat washer 156 and a wave washer 158 on the other side. The member 146 also has a rearwardly extending knob 160 with a knurled outer surface which can be turned by an operator to rotate the member 146 and thereby move the sleeve 142 in and out (compare FIGS. 1 and 5) to change the compression on the spring 134 and the plunge rate of the chuck assembly 28. The knob 160 has a slot 162 therein through which an operator can view the end of the sleeve 142 so as to determine the position of the sleeve 142 relative to the spring 134. To manipulate the threaded member 146, the cap 26 must be removed. The cap has a threaded shank 164 which is engaged in a bushing 166 in the knob 160.

In the operation of the tool 10, the setscrews 86 for the supporting legs 38 are loosened and the sleeve 98 adjusted relative to the rod 92 to position the foot 36. With the rear surface of the foot body 70 bearing against the end of the sleeve 98, the setscrews 86 are tightened to firmly position the foot 36 relative to the body 16 and thereby determine the length of the plunge stroke of the stud 12 and the chuck assembly 28. The rear limit of the stud stroke is always fixed, being with the flange 122 against the end 124 of the coil 126. With the floating spark shield 34, it is always assured that the outer end 82 will be against the workpiece when the positioning posts 84 are in position against the workpiece.

The operator can then pull back on the flange disc 102 to move the magnetic flange 122 against the coil where it is retained with the coil being energized. However, the flange 122 can be retracted otherwise, as by mechanical means or a solenoid. When a trigger 168 is pulled, power to the coil 126 is cut off and a high voltage potential from a capacitive power source is imposed through the cable 114 between the stud 12 and the workpiece when the positioning post 84 are in contact with the workpiece. A wire 170 (FIG. 2) is connected to the frame 22 and to the workpiece for this purpose. With the coil 126 off, the plunge spring 134 moves the chuck assembly 28 and the stud 12 toward the workpiece with the force of the plunge stroke determined by the amount of compression on the spring 134. The farther forward the sleeve 142, the greater is the compression of the spring 134 and the greater is the force of the plunge stroke. As the chuck assembly and the stud move forwardly, current will pass through the tip 14 as it contacts the workpiece. This vaporizes the tip 14 and causes an arc to exist for a short time between the stud and the workpiece, until the stud contacts the workpiece. The tip and adjacent portions of the stud and the workpiece become molten to provide a firm weld between the stud and the workpiece.

Various modifications of the above-described embodiment of the invention will be apparent to those skilled in the art and it is to be understood that such modifications can be made without departing from the scope of the invention, if they are within the spirit and the tenor of the accompanying claims.

We claim:

1. In a tool for welding a stud to a workpiece, a tool body, a chuck leg supported for longitudinal movement with respect to said body, a chuck, means for removably connecting said chuck to an end of said chuck leg with said chuck extending beyond a forward end of said tool body, a welding foot, means for adjustably supporting said welding foot relative to said tool body, threaded rod means extending between said tool body and said welding foot for positioning said welding foot at selected distances from said tool body, spark shield means carried by said welding foot around said chuck for movement toward and away from said tool body, a spring around a rear portion of said chuck leg, said chuck leg having first seating means engageable with a portion of said spring, second seating means separate from said chuck leg and engageable with another portion of said spring, and means for moving said second seating means toward and away from said first seating means to change the compression on said spring.

2. A tool according to claim 1 characterized by said removable connecting means comprises a first beveled surface on said chuck leg, a nut threadedly engageable with said chuck leg and having a beveled surface facing the first beveled surface, and a ring around said chuck between said beveled surfaces and engageable thereby.

3. A tool according to claim 1 characterized by said threaded means comprises a threaded rod connected to one of said body and said foot and extending toward the other of said body and said foot, and a threaded sleeve mounted on said threaded rod and engageable with the other of said foot and said body.

4. A tool according to claim 3 characterized by said sleeve having a noncircular outer surface.

5. A tool according to claim 1 characterized by said welding foot having an opening through which said spark shield extends, said spark shield having limit means on both sides of said foot and engageable with said foot around the opening therein to limit movement of said shield in both directions relative to said foot.

6. A tool according to claim 5 characterized by at least one of said limit means being removable from said spark shield.

7. A tool according to claim 1 characterized by said second seating means comprises a sleeve around an end portion of said chuck leg, and means for moving said sleeve longitudinally of said chuck leg.

8. A welding tool according to claim 7 characterized by a threaded member cooperating with said sleeve to move said sleeve longitudinally when said threaded member is turned.

9. In a tool for welding a stud to a workpiece, a tool body, a chuck, means for supporting said chuck in a position extending forwardly of said tool, a spark shield, a welding foot holding said spark shield in a position around said chuck, a supporting leg attached to said foot and extending toward said tool body, said tool body having means for adjustably connecting said leg to said body, a threaded rod connected to one of said body and said foot and extending toward the other of said body and said foot, a threaded sleeve mounted on said threaded rod and engageable with said other of said foot and said body to position said foot at a particular distance from said body and to position said foot in a particular relationship with respect to said chuck.

10. A tool according to claim 9 characterized by said spark shield being movably held by said foot for limited movement toward and away from said tool body.

11. A tool according to claim 9 characterized by said sleeve having a noncircular outer surface.

12. A tool according to claim 11 characterized by said sleeve having a plurality of flat areas on the outer surface.

13. In a tool for welding a stud to a workpiece, a tool body, a chuck, means for supporting said chuck in a position extending forwardly of the tool body, a spark shield, a welding foot supported by said body and holding the spark shield loosely to enable said spark shield to float relative to said foot and said chuck, and positioning means rigidly extending forwardly of said welding foot to engage the workpiece and position said welding foot at a fixed distance from the workpiece, whereby said spark shield will be positioned with a forward end thereof against a workpiece when the tool is in a welding position with said positioning means engaging the workpiece.

14. A tool according to claim 13 characterized by said foot having an opening therein through which said spark shield extends, said spark shield having a shoulder exceeding the size of said opening on one side of said foot, and said spark shield having removable means extending beyond the periphery of said opening on the other side of said foot, with the distance between said shoulder and said removable means exceeding the thickness of said foot.

15. A tool according to claim 14 characterized by said removable means being a ring engageable with a groove in said spark shield and extending outwardly beyond the periphery of the spark shield.

16. In a tool for welding a stud to a workpiece, a tool body, a chuck leg in said tool body and supported for longitudinal movement with respect thereto, a coil spring located around a rear portion of said chuck leg, said chuck leg having seating means against which one end of said coil spring is engaged, second seating means located around said chuck leg against which the other end of said coil spring is engaged, said second seating means comprising a sleeve having outer threads and having a central opening exceeding the size of the rear portion of said chuck leg and held in a nonrotatable position relative to said chuck leg, and adjustable means for moving said second seating means toward and away from said first seating means when the chuck leg is stationary, said adjustable means comprising threaded means engagable with the threads of said sleeve.

17. A tool according to claim 16 characterized by means for rotatably holding said threaded means in a fixed longitudinal position relative to said tool body, said threaded means having means extending rearwardly to facilitate rotation of said threaded means to cause said sleeve to move longitudinally of said body.

18. A tool according to claim 17 characterized by said last-named means having an opening through which the relative position of said threaded sleeve can be determined.

19. In a tool for welding a stud to a workpiece, a chuck leg having a recess forming an annular end, said end having a bevel facing inwardly and toward said end of the leg, an end surface of said leg being threaded, a nut having a central opening at one end and a larger opening at the other end, the end having the larger opening having threads, said nut being threadedly engaged with said leg, said nut having a bevel around said central opening facing inwardly and toward said leg bevel, said central opening and a portion of said leg recess having substantially the same diameters, a chuck having a diameter slightly less than that of said central opening and said recess portion and extending through said central opening into said recess, said recess having an insulating sleeve against which an end of said chuck abuts, a ring on said chuck having a diameter slightly larger than said chuck, and said ring having surfaces cooperating with said bevels to urge said ring toward said chuck when said nut is tightened on said leg.

20. In a tool for welding a stud to a workpiece, a chuck leg having a recess forming an annular end, said end having a bevel facing inwardly and toward said end of the leg, an end surface of said leg being threaded, a nut having a central opening at one end and a larger opening at the other end, the end having the larger opening having threads, said nut being threadedly engaged with said leg, said nut having a bevel around said central opening facing inwardly and toward said leg bevel, said central opening and a portion of said leg recess having substantially the same diameters, a chuck having a diameter slightly less than that of said central opening and said recess portion and extending through said central opening into said recess, a ring on said chuck having a diameter slightly larger than said chuck, said ring having surfaces cooperating with said bevels to urge said ring toward said chuck when said nut is tightened on said leg, and a threaded adjustable rod in said chuck to abut a stud held in the chuck at the end opposite the chuck leg.

21. In a tool for welding a stud to a workpiece, a chuck leg having a recess forming an annular end, said end having a bevel facing inwardly and toward said end of the leg, an end surface of said leg being threaded, a nut having a central opening at one end and a larger opening at the other end, the end having the larger opening having threads, said nut being threadedly engaged with said leg, said threaded surface of said chuck leg having a circular disc threaded thereon and extending outwardly therefrom, said nut having a bevel around said central opening facing inwardly and toward said leg bevel, said central opening and a portion of said leg recess having substantially the same diameters, a chuck having a diameter slightly less than that of said central opening and said recess portion and extending through said central opening into said recess, a ring on said chuck having a diameter slightly larger than said chuck, and said ring having surfaces cooperating with said bevels to urge said ring toward said chuck when said nut is tightened on said leg.

* * * * *